United States Patent
Kottke et al.

(10) Patent No.: US 7,481,663 B2
(45) Date of Patent: *Jan. 27, 2009

(54) DISPLAY SYSTEMS AND RELEASABLE POWER CLAMP FOR USE THEREWITH

(75) Inventors: Frederick L. Kottke, Menomonee Falls, WI (US); Richard P. Homblad, Shorewood, WI (US)

(73) Assignee: DCI Marketing, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/952,845

(22) Filed: Dec. 7, 2007

(65) Prior Publication Data

US 2008/0102690 A1    May 1, 2008

Related U.S. Application Data

(63) Continuation of application No. 11/467,734, filed on Aug. 28, 2006, now Pat. No. 7,318,745.

(51) Int. Cl.
*H01R 13/15* (2006.01)
(52) U.S. Cl. ...................................... 439/259
(58) Field of Classification Search ................. 439/493, 439/259, 329, 632, 637, 357
See application file for complete search history.

(56) References Cited

U.S. PATENT DOCUMENTS

| 4,636,018 | A | | 1/1987 | Stillie |
| 5,083,076 | A | * | 1/1992 | Scott .......................... 320/105 |
| 5,123,851 | A | | 6/1992 | Young et al. |
| 5,295,838 | A | | 3/1994 | Walen et al. |
| 5,505,625 | A | | 4/1996 | Byer et al. |
| 5,669,775 | A | | 9/1997 | Campbell et al. |
| 5,676,562 | A | | 10/1997 | Fukuda |
| 6,665,191 | B2 | | 12/2003 | Blood et al. |
| 6,769,920 | B1 | | 8/2004 | Mease et al. |
| D497,344 | S | | 10/2004 | Huang |
| 6,869,291 | B2 | | 3/2005 | Norland et al. |
| 6,960,094 | B2 | | 11/2005 | Tomonari et al. |
| 6,994,591 | B2 | | 2/2006 | Huang |
| 7,033,208 | B1 | | 4/2006 | Huang et al. |
| 7,173,244 | B2 | * | 2/2007 | Tomita et al. ............. 250/336.1 |
| 7,318,745 | B1 | * | 1/2008 | Kottke et al. ................. 439/493 |
| 2002/0141123 | A1 | | 10/2002 | Bishop et al. |
| 2005/0199818 | A1 | * | 9/2005 | Tomita et al. ........... 250/370.01 |
| 2007/0230910 | A1 | * | 10/2007 | Welch et al. ................... 386/96 |

* cited by examiner

*Primary Examiner*—Jean F Duverne
(74) *Attorney, Agent, or Firm*—Brian G. Gilpin; Godfrey & Kahn, S.C.

(57) ABSTRACT

Display systems and a power clamp for use therein, the power clamp configured to releasably connect an illuminated graphics panel to a power source, are disclosed. The power clamp includes an actuating member, a biasing mechanism, a connector housing for retaining connector and a power ribbon or cable, the power clamp providing a safe and efficient method of temporarily securing and removably releasing a flexible printed circuit or illuminated graphics panel into a display system without requiring hard wiring of the panel to the display system, the printed circuit board or power source.

6 Claims, 10 Drawing Sheets

DISPLAY SYSTEMS AND RELEASABLE POWER CLAMP FOR USE THEREWITH

PRIORITY CLAIM

This application is a continuation of U.S. application Ser. No. 11/467,734, filed on Aug. 28, 2006 now U.S. Pat. No. 7,318,745, which is specifically incorporated herein by reference in its entirety for all purposes. This application claims the benefit of U.S. application Ser. No. 11/467,734 under 35 U.S.C. § 120.

BACKGROUND OF THE INVENTION

The present invention relates generally to electrically illuminated display systems. More particularly, the present invention relates to display systems and a power clamp for use therewith, the power clamp providing a safe and efficient method of removably securing and releasing a flexible printed circuit or illuminated graphics panel to a display system without requiring hard wiring of the panel to the display system, the printed circuit board or power source.

Merchandising systems, product displays and point of purchase retail display systems can take various forms, including shelf-mounted signs, hanging posters and brochure or literature display fixtures. Since an estimated 70% of purchase decisions are made within the retail store itself, effective merchandising displays can have a dramatic impact on sales for a particular product category or brand. Recently, conventional posters and signs have given way to electronic, dynamic display systems that present targeted product information as well as artwork or graphics to attract the attention of consumers. These electronic display systems typically incorporate illuminated posters, panels, screens or walls such as those containing light emitting diodes (LED), liquid crystal display screens, plasma screens or other illuminated components.

Of particular interest in display systems are electronically illuminated graphics panels, such as electroluminescent panels or lighting incorporating one or more phosphor layers or those including electrically functional inks printed on to a flexible substrate. Illuminated graphics panels are thin and flexible, making them easy to manufacture and install, and particularly advantageous where space in a showroom, lobby or retail environment is limited. Typically, an illuminated graphics panel comprises a flexible printed circuit which provides the electrical connection to the electroluminescent panel or illuminated graphics display, while not adding to the size, and in particular, the weight or thickness of the display panel.

However, illuminated graphics panels and display systems that incorporate flexible printed circuits must be secured to a power source by soldering, plug and socket assemblies, receptacle/clamping assemblies or otherwise permanently securing the electrical contacts or terminals on the flexible printed circuit to those of the power source, rigid circuit board or electrical connector. Several of these types of connectors are found in the prior art, such as U.S. Pat. No. 6,960,094 to Tomonari et al., which requires soldering of the connector to both the flexible printed circuit and the printed circuit board. U.S. Pat. No. 7,033,208 to Huang et al. describes a receptacle-type connector, in which each flexible printed circuit is permanently anchored within a receptacle to ensure a proper connection between the circuits. U.S. Pat. No. 6,869,291 to Norland et al. utilizes a connector including nonconductive elastomeric pads that urge the contacts of a flexible printed circuit into engagement with the contacts on a printed circuit board; however, sufficient connection is not made without rigidly fastening the printed circuit board to the flexible printed circuit.

Hard wiring or soldering of the flexible printed circuit contacts to a power source can introduce contaminants or scratches on the contacts, resulting in an incomplete or ineffective electrical connection, causing shorting within the system. Where machine screws or permanent clamps are used in place of soldering, such mechanisms conventionally require physical, permanent attachment of the FPC to the printed circuit, proper alignment, and such compressive force can cause damage to the contacts on the FPC.

In addition, due to the limited space and size of the electrical connections on a flexible printed circuit panel, the area for soldering is small and difficult to perform, which may also result in an incomplete or ineffective electrical connection.

Even when an adequate permanent connection is made, removal of the illuminated graphics panel from the power source damages the electrical contacts on the flexible printed circuit, therefore destroying the illuminated panel and requiring replacement of the contacts on the connector, circuit board or power source.

Accordingly, a need exists for a display system and electrical connector that provides power transfer capability between the electronically illuminated graphics panel and a power source, such as a circuit board or connection cable, without requiring hard wiring or soldering of the flexible printed circuit contacts to the source. In addition, there exists a need for a display system including a flexible printed circuit connector that is designed for multiple open/close cycles without damaging the graphics panel and/or the contacts on the connector or power source.

SUMMARY OF THE INVENTION

The present invention provides, in part, display systems and a power clip for use in such merchandising display systems and other types of illuminated or electrically powered signs, panels or point of purchase display systems for electrically connecting a flexible printed circuit to a power source, such as a circuit board or connector. The power clamp generally includes an actuating member, a biasing mechanism, a connector housing for retaining an elastomeric connector and a power ribbon or cable.

The actuating member and the connector housing together retain a connecting end of the power cable such that the connecting end is electrically connected to the elastomeric connector positioned within the connector housing. The power clamp is pivotally secured within the display housing via the biasing mechanism.

The biasing mechanism is secured to both the display housing and to the power clamp, permitting the power clamp to actuate between a first energized position, wherein the power clamp functionally engaged to the power source and in which the elastomeric connector is in electrical communication with the contacts of the flexible printed circuit; a second, unenergized position in which the housing is slidably moved away from the power source and a third, released position, wherein the housing is pivoted away from the flexible printed circuit to release the circuit, the power clamp providing a safe and efficient method of securing and releasing a flexible printed circuit or illuminated graphics panel into a display system without requiring hard wiring of the panel to the display system, the printed circuit board or power source.

The present invention also provides, in part, display systems including a power clamp that permits easy installation and removal of an illuminated graphics panel/flexible printed circuit to a display system, without requiring hard wiring or soldering of the contacts of the flexible circuit panel to the connector or power source. The power clamp permits multiple open/close cycles without damaging the flexible printed circuit and/or the contacts on the connector or power source. Release and replacement of the illuminated graphics panel from the display system requires positive action on the part of the user, i.e. depression of the clamp handle or actuator, ensuring the system is unenergized prior to releasing the panel from the system.

In addition, the power clamp of the present invention ensures sufficient contact between the terminal portion of the flexible printed circuit and the contacts of the elastomeric connector, without requiring hard wire or soldering, without scratching adding contaminants on the terminal portion of the flexible printed circuit.

It will be understood by those skilled in the art that one or more aspects of this invention can meet certain objectives, while one or more other aspects can lead to certain other objectives. Each objective may not apply equally, in all instances, to every aspect of the present invention. As such, these and other objects can be viewed in the alternative with respect to any one aspect of the present invention.

Other objects, features, benefits and advantages of the present invention will be apparent in this summary and descriptions of the disclosed embodiments, and will be readily apparent to those skilled in the art. Such objects, features, benefits and advantages will be apparent from the above as taken in conjunction with the accompanying figures and all reasonable inferences to be drawn therefrom.

DETAILED DESCRIPTION OF PREFERRED EMBODIMENTS

Illustrative embodiments of a power clamp and display systems for use therewith in accordance with the present invention are shown in FIGS. 1 through 17. While the invention may be susceptible to embodiment in different forms, there are shown in the drawings, and herein are described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

FIGS. 1 through 13 illustrate one embodiment of a display system 50 incorporating a power clamp 52 consistent with the teachings of the present invention. In addition to the power clamp 52, the display system 50 includes, in its simplest form, front and rear housing components 150 and 152, a microswitch 154 and circuit board 156 assembly, a stand 54 and an illuminated graphics panel 56. While the power clamp 52 is described for use with illuminated display and/or point of purchase systems, it will be readily appreciated that the power clamp 52 of the present invention may be used to releasably secure a flexible printed circuit to a circuit board or another power source, where the ease of assembly, modification of the display and/or connection/disconnection of the power to the clamped device is advantageous or required by the particular application.

Figure 1:
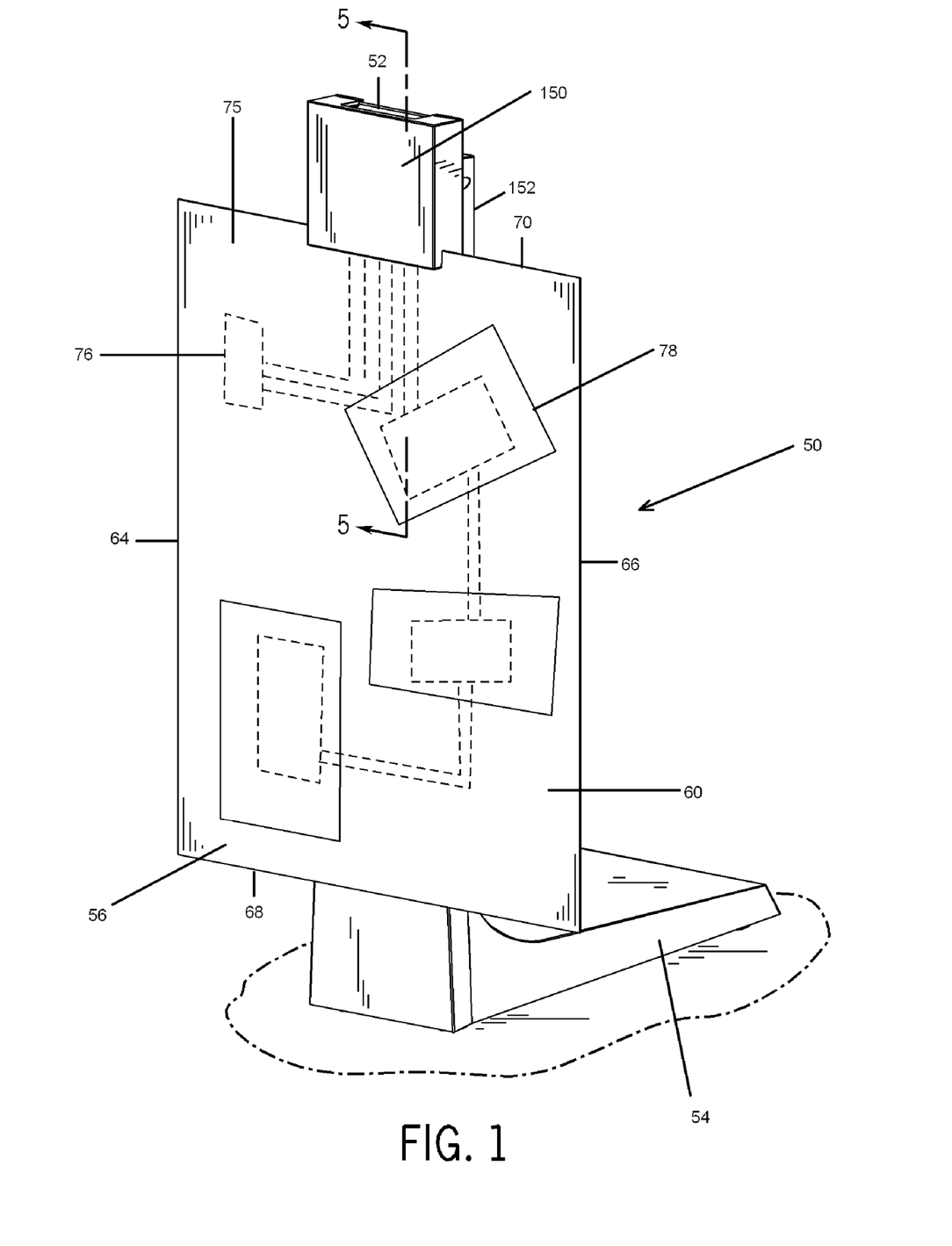
FIG. 1 is a front perspective view of a display system and a power clamp according to one embodiment of the present invention.
Figures 3A, 3B:
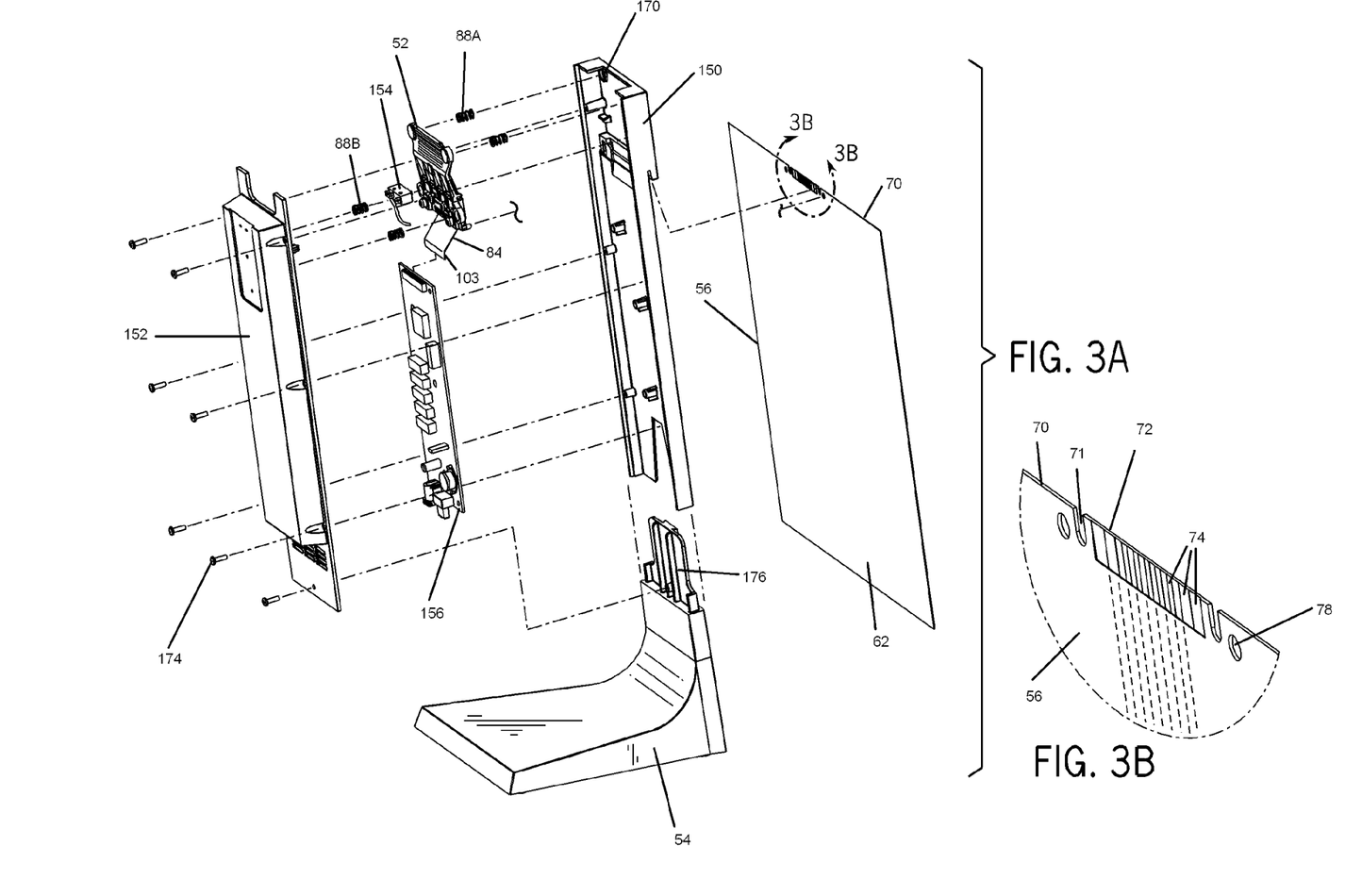
FIG. 3A is an exploded perspective view of the display system illustrated in FIGS. 1 and 2.
FIG. 3B is a partial cross-sectional view of an illuminated graphics panel including a flexible printed circuit, illustrating the connection portion thereof.

As illustrated in FIGS. 1 and 3A, the illuminated graphics panel 56 preferably comprises at least one layer, and has a front surface 60, a rear surface 62 and side edges 64, 66, 68 and 70. One or both of the front and rear surfaces 60 and 62 may contain printed indicia or other artwork related to the product or message to be displayed on the graphics panel 56. One or more layers of the illuminated graphics panel 56 preferably includes an electroluminescent layer comprising a phosphor or similar electroluminescent material (not shown) for illuminating at least a portion of the graphics panel 56, as will be well known to those skilled in the art. It will be appreciated that the display system 50 and/or the illuminated graphics panel 56 may include one or more electrically illuminated devices or materials, including those incorporating LED, fiber optics and/or another electroluminescent device.

The illuminated graphics panel 56 comprises a flexible printed circuit (FPC) 75 containing one or more conductive/illuminating patterns 76 formed therein for illuminating one or both of the surfaces of the graphics panel 56, as is well known to those skilled in the art. It will be readily recognized that although the present invention is illustrated and described with respect to display systems 50 incorporating the flexible printed circuit 75 to supply power to the display, the present invention can be utilized with rigid flex circuits and/or other types of printed circuit boards.

As illustrated in FIG. 3B, a connecting portion 72 is preferably located along the top side edge 70 of the illuminated graphics panel 56. A plurality of electrical terminals or contacts 74 is provided on the rear surface 62 for supplying power to the graphics panel 56. The conductive/illuminating patterns 76 and the contacts 74 may be constructed of copper, gold or another conductive material known in the art. The connecting portion 72 further includes alignment slots 71 and mounting apertures 78 for properly positioning the graphics panel 56 within the power clamp 52, as will be described in more detail below.

Turning next to FIGS. 4A, 4B and 11-13, the power clamp 52 generally includes a actuating member 80, a connector housing member 82 and a power ribbon or cable 84. The power ribbon or cable 84 includes first and second connecting ends 102 and 103 and may be any of those conventionally utilized for electrically connecting printed circuit boards together, as is well known to those skilled in the art.

The actuating member 80 has a front side 89, oriented towards the front of the display system when installed therein, a rear side 87, oriented towards the rear of the display system when installed therein, and side edges 91 and 93, respectively. Each of the front and rear sides 89 and 87 of the actuating member 80 includes receptacles 86A and 86B, respectively, for retaining a biasing mechanism, such as the springs 88A and 88B (shown in FIGS. 3A and 5). A ramp 97 extends away from the rear side 87 of the actuating member 80 to provide a contact surface for releasably engaging an actuator 99 of the microswitch 154. A button or lever 90, located on the rear side 87 of the actuating member 80 near the top thereof, is provided for moving the ramp 97 of the actuating member 80 into and out of contact with the microswitch actuator 99, to supply the clamp 52 with power and/or to release the graphics panel 56 from the clamp 52.

Figure 4A:
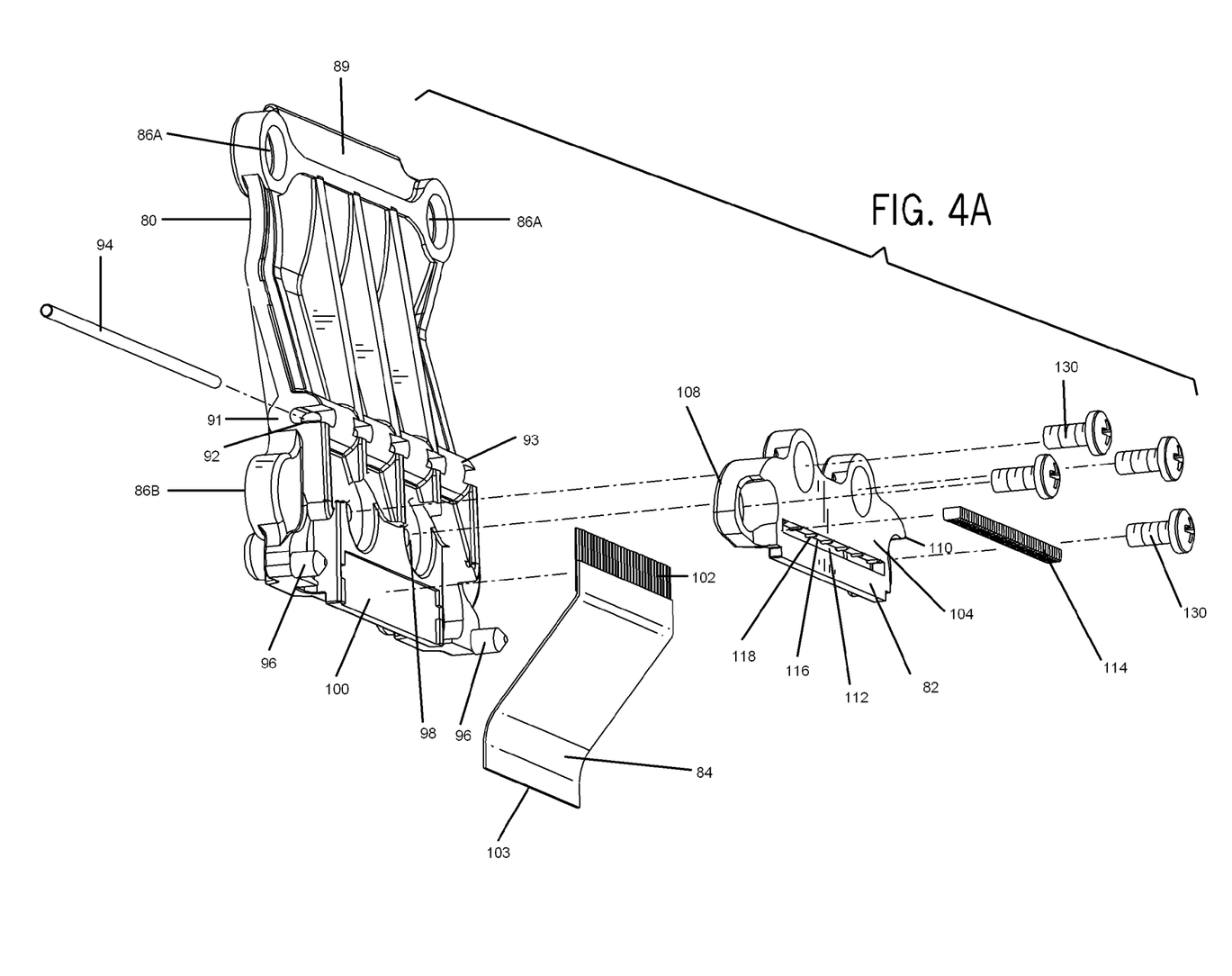
FIG. 4A is an exploded perspective view of a power clamp according to the teachings of the present invention.
Figure 9:
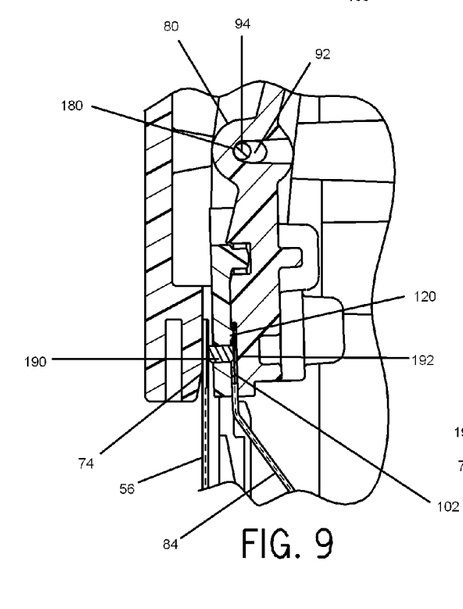
FIG. 9 is a partial side view of the display system and power clamp illustrated in FIGS. 1 through 8, taken along line 9-9 in FIG. 8, showing electrical connection of the elastomeric connector with the contact portion of the flexible printed circuit, wherein the clamp is in the first position such that the illuminated graphics panel is electrically connected to the power source.
Figure 10:
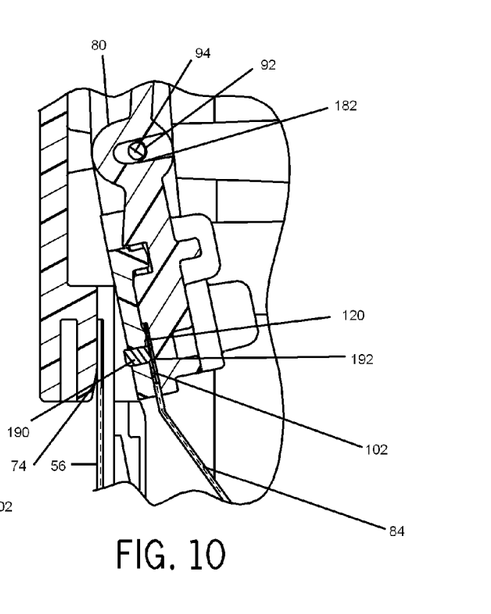
FIG. 10 is a partial side view of the display system and power clamp illustrated in FIGS. 1 through 8, showing disengagement of the elastomeric connector and the flexible printed circuit, wherein the clamp is in the third position such that the illuminated graphics panel can be removed from the display system.

As best illustrated in FIGS. 4A, 9 and 10, an elongated, oval channel 92 extends from one side edge 91 of the actuating member 80 to the other side edge 93 of the actuating member 80. A rod or pin 94 will be positioned within the channel 92 when the power clamp 52 is installed within the display system 50. The size of the internal diameter of the channel 92 permits slidable and pivotable movement of the actuating member 80 with respect to the stationary pin 94, as will be described in more detail herein. Mounting pegs 96 extend outwardly from the front side 89 of the actuating member 80 and are aligned with and configured to engage the corresponding mounting apertures 78 on the graphics panel 56.

Figures 11, 12, 13:
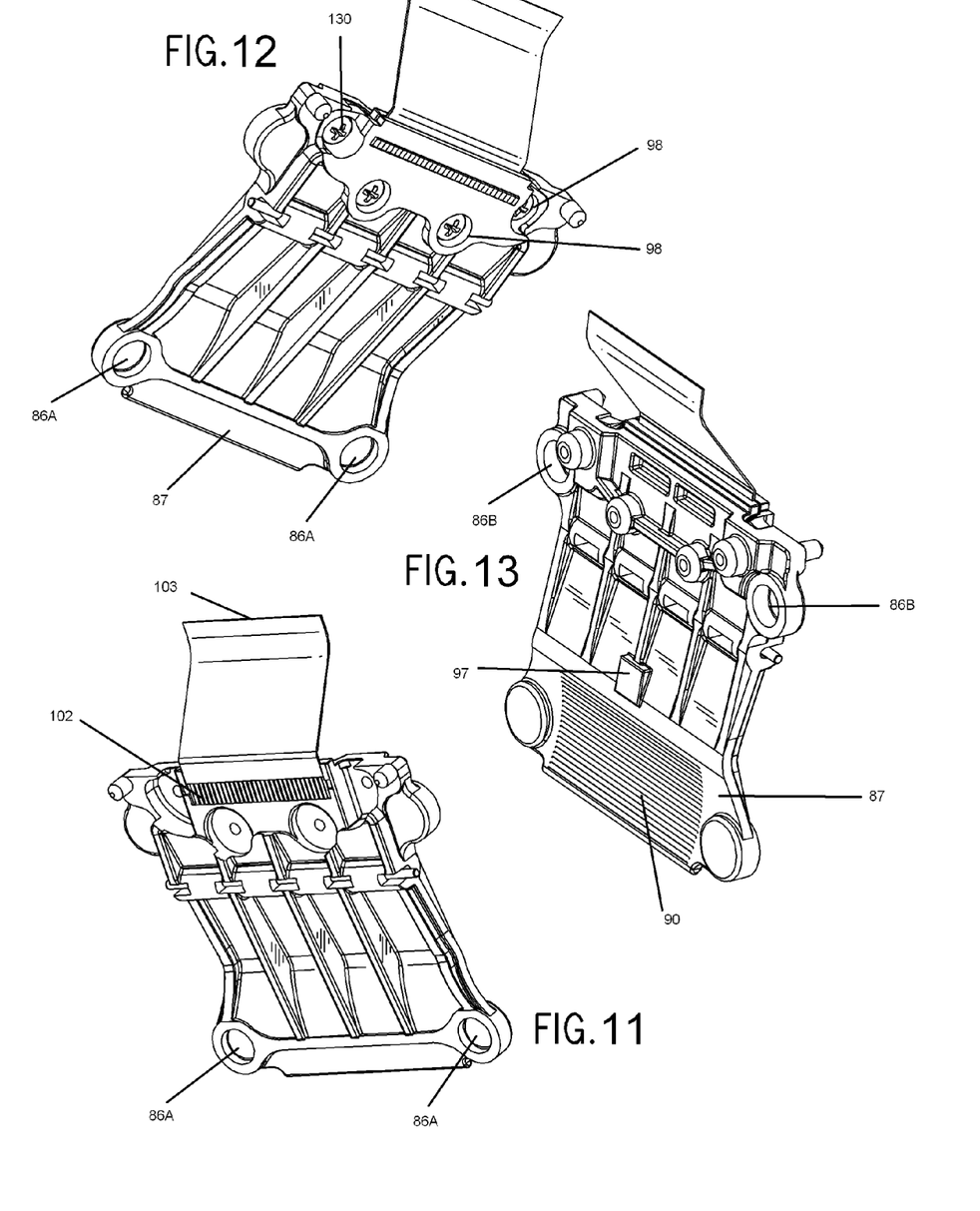
FIG. 11 is a front perspective view of the clamp assembly illustrated in FIG. 4A, shown without the connector housing attached thereto.
FIG. 12 is a front perspective view of the clamp assembly illustrated in FIG. 4A.
FIG. 13 is a rear perspective view of the clamp assembly illustrated in FIG. 4A.

As illustrated in FIGS. 4A and 11, the front side 89 of the actuating member 80 includes a substantially flat surface 100 for mating with and receiving the connecting end 102 of the power cable 84. Apertures 98 are provided for securing the power clamp 52 together during assembly. Further, the apertures may be provided within a recess to permit a fastening mechanism such as a screw or a bolt to be recessed within the housing or otherwise positioned so as to not interfere with operation of the clamp. Preferably, the actuating member 80 is of unitary construction and manufactured from a substantially rigid thermoplastic material. However, the actuating member 80 may be manufactured in several parts and secured together, depending on particular manufacturing and application requirements. In addition, the actuating member 80 may be constructed of any commonly used nonconductive material.

Figures 4B, 5:
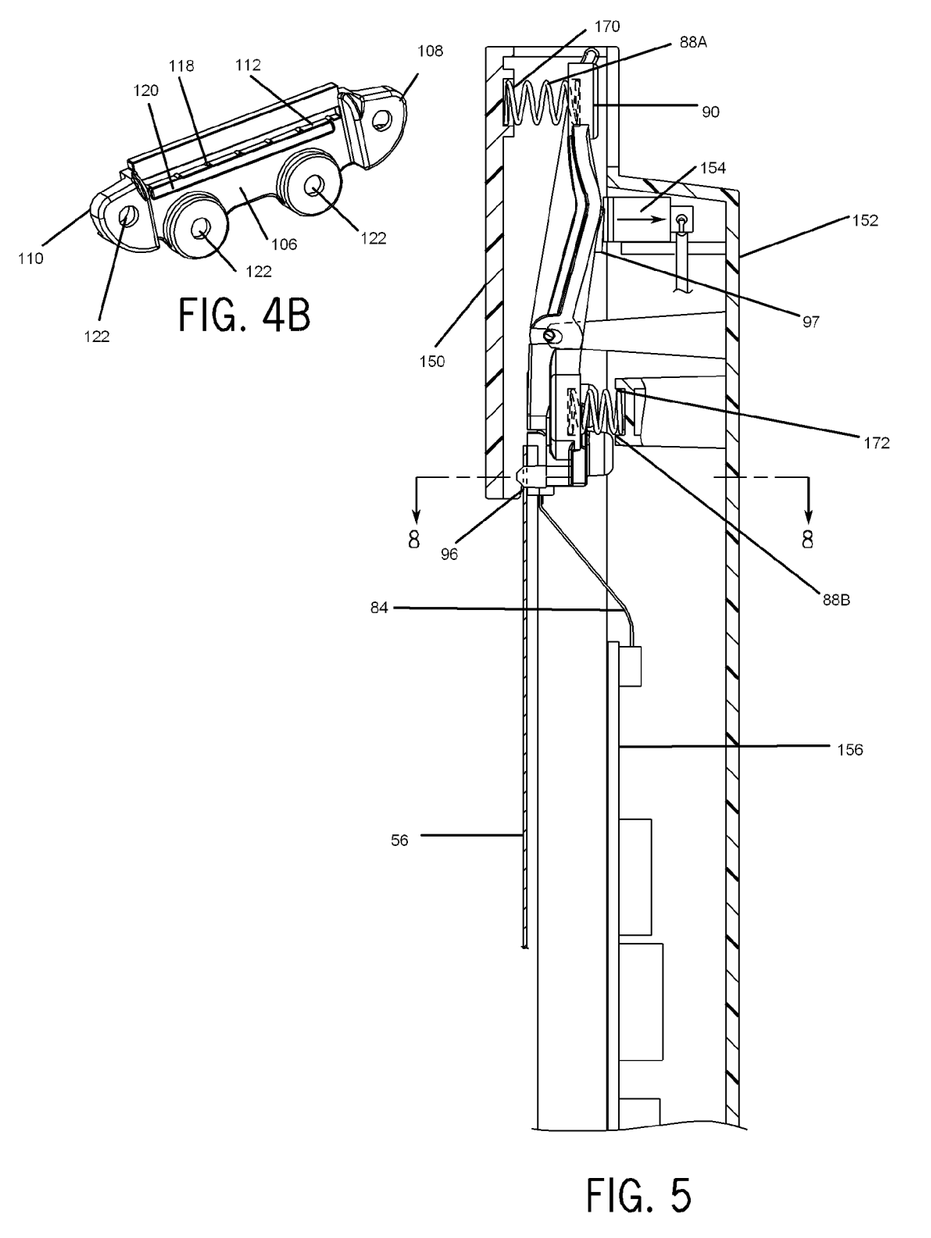
FIG. 4B is a rear perspective view of the back side of the connector housing for use in the power clamp illustrated in FIG. 4A.
FIG. 5 is a partial side view of the display system and power clamp illustrated in FIGS. 1 through 4, illustrating the power clamp in a first position, wherein the illuminated graphics panel is secured in position on the display system and electrically connected to a circuit board.

As best illustrated in FIGS. 4A and 4B, the housing member 82 has a front side 104, oriented towards the front of the display system when installed therein, a rear side 106, oriented towards the back of the display system when installed therein, and side ends 108 and 110. The housing member 82 includes a channel 112 extending from the front 104 to the rear side 106 and is configured to retain an elastomeric electrical connector 114. The elastomeric connector 114 includes a front conductive interface 190 and a rear conductive interface 192 in electrical communication with each other. When positioned inside the channel 112, a portion of the front conductive interface 190 and the rear conductive interface 192 of the elastomeric connector 114 will extend beyond the edges of the channel 112, as best illustrated in FIGS. 9 and 10.

An inside surface 116 of the channel 112 includes a plurality of ribs 118. Importantly, the channel 112 is sized to permit limited float of the uncompressed elastomeric connector 114 within the channel 112 but ensures sufficient contact pressure against the flexible printed circuit when the elastomeric connector 112 is in a compressed state.

The elastomeric connector 114 is preferably of the type comprising alternating conductive and non-conductive layers, wherein the conductive layers are oriented vertically in the thickness direction, making contact from top to bottom. In certain embodiments, the elastomeric connector 114 comprises a silicone core around which metallic gold-plated conductors are vulcanized in a row parallel to each other, such as those sold under the trademark ZEBRA® (Fujipoly, Carteret, N.J.). However, the particular elastomeric connector used in the present invention may be selected based on the particular application and type of flexible printed circuit, and the electrical requirements of the particular display system. Consistent with the broader aspects of the present invention, any type of electrical connector known to those skilled in the art configured to fit within the channel 112 may be used in the present invention.

An elongated protrusion or rib 120 extends outwardly from the rear surface 106 of the housing member 82 along the length of the channel 112 to retain the connecting end 102 of the cable 74 between the actuating member 80 and the connector housing 82. Apertures 122 are provided for securing the power clamp 52 together during assembly. As with actuating member 80, the connector housing member 82 is of unitary construction and manufactured from a substantially rigid thermoplastic material. However, the housing member 82 may be manufactured in several parts and secured together, depending on particular manufacturing and application requirements and is preferably constructed of a nonconductive material.

With reference to FIGS. 4A, 4B and 11-13, the power clamp 52 is assembled by positioning the elastomeric connector 114 within the channel 112 of the connector housing 82. The connecting end 102 of the cable 84 is positioned so that one surface of the connecting end 102 mates with and contiguously abuts the surface 100 of the actuating member 80, as illustrated in FIG. 11. The connector housing 82 is then positioned with the rear side 106 oriented towards the connecting end 102 of the cable 84, so that it abuts the rib 120. Fastening elements, such as bolts or screws 130, are threaded through the apertures 122 in the connector housing 82 and the corresponding apertures 98 in the actuating member 80, securing the actuating member 80, the power cable 84 and connector housing 82 together.

Figure 2:
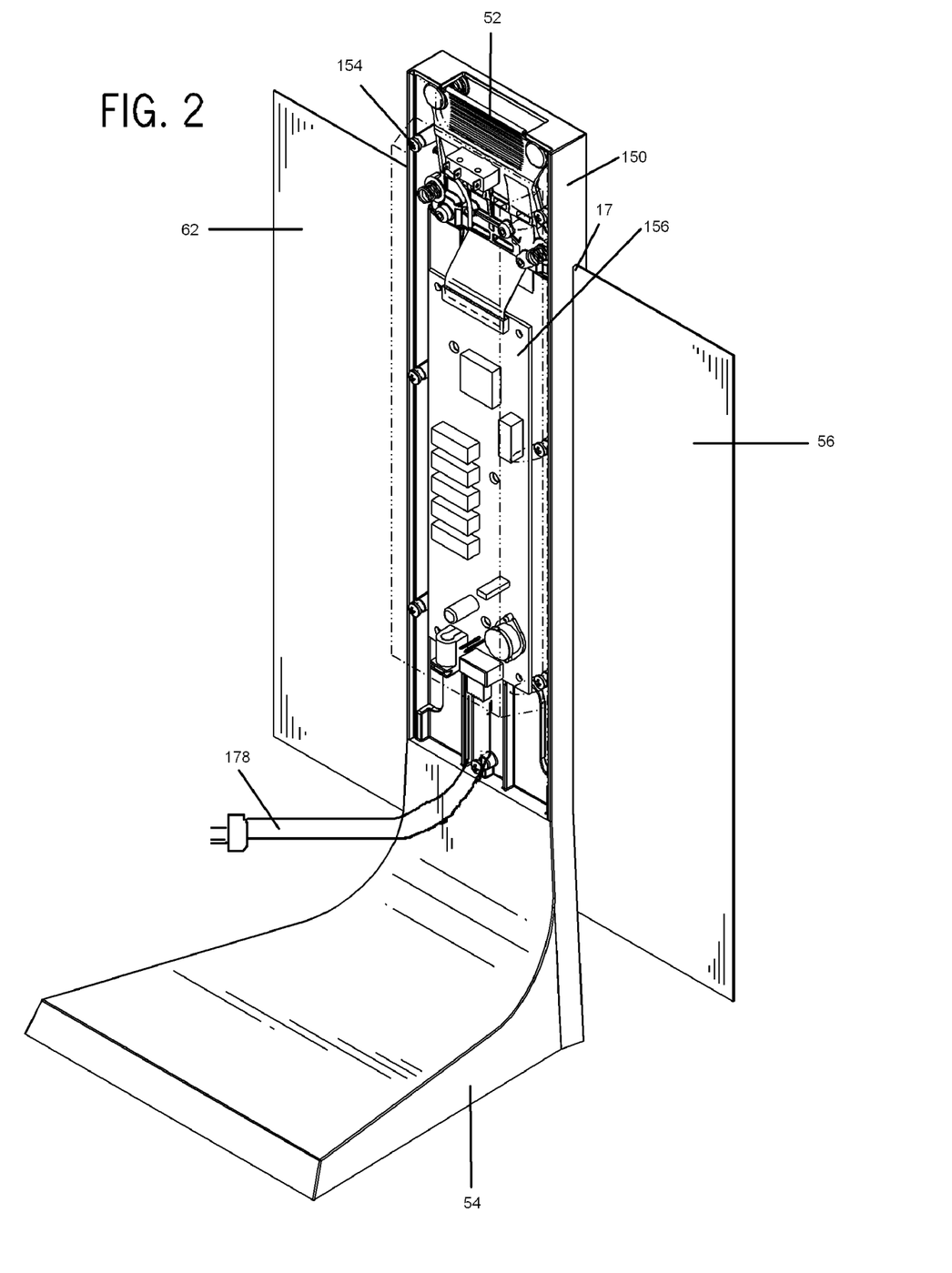
FIG. 2 is a rear perspective view of the display system illustrated in FIG. 1, shown with rear housing member removed.

With reference to FIGS. 2 and 3A, the display system 50 is assembled by securing the power clamp 52 to the front housing component 150. In particular, the front housing component 150 is provided with receptacles 170. Each receptacle 170 is configured to receive a first end of the spring 88A. The second end of each of the springs 88A is positioned within the receptacles 86A located on the front side 89 of the actuating member 80. The pin 94 is positioned within the oval shaped channel 92 of the actuating member 80 and each end is stationarily secured to the front housing component 150.

The microswitch 154 is positioned such that the actuator 99 is in functional engagement with the ramp 97 of the actuating member 80 and is electrically connected to the circuit board 156 by wire or any conventional means known to those skilled in the art. The connecting end 103 of the cable 84 is also electrically connected to the circuit board 156 by any conventional means known to those skilled in the art.

A first end of each of the springs 88B is positioned within each of the receptacles 86B located on the rear side 87 of the actuating member 80, respectively. The second end of each of the springs 88B is positioned within a corresponding receptacle 172 located on the inside surface of the rear housing component 152, as illustrated in FIG. 5. The rear housing component 152 is then secured to the front housing component 150 using fastening elements, such as bolts or screws 174. As illustrated in FIG. 3A, the fastening elements pass through the circuit board 156, to secure it in place within the display housing.

The display stand 54 is then secured to the bottom of the display system 50 and includes a top portion 176 configured to interfit and secure to the front housing component 150, as illustrated in FIG. 3A. A power input or cord 178 is electrically connected to the circuit board 156 by conventional means and extends through the rear housing component 152 of the display system 50. As such, the stand 54 permits the display system 50 to be positioned on any flat surface.

With reference to FIGS. 5 through 10, operation of the power clamp 52 of the present invention will now be described. FIGS. 5 and 9 illustrate the power clamp 52 in a first, energized position. In particular, the springs 88A bias the top portion of the actuating member 80 towards the rear of the display system 50, such that the ramp 97 functionally engages the actuator 99 of the microswitch 154. The springs 88B bias the bottom portion of the actuating member 80 towards the front of the display system 50, such that the actuating member 80 is positioned with the pin 94 at the frontmost portion 180 of the oval channel 92, as illustrated in FIG. 9. The springs 88A and 88B may be of any type known to those skilled in the art, provided the relative tension in each of the sets of springs 88A and 88B permit proper orientation of the actuating member 80, as described above.

As also best illustrated in FIG. 9, when the actuating member 80 is in the energized position, the connecting end 102 of the cable 84 is urged against the rear conductive interface 192 of elastomeric connector 114, electrically connecting the cable 84 and the elastomeric connector 114. In this position, the connecting end 102 at least partially compresses the connector 114 within the channel 112. As illustrated in FIG. 5, in the first, energized position, the mounting pegs 96 on the actuating member 80 engage the corresponding mounting apertures 78 on the graphics panel 56 and secure the panel 56 within the system. In this energized position, a user can not remove the graphics panel 56 or access any of the energized contacts within the power clamp 52.

Figure 6:
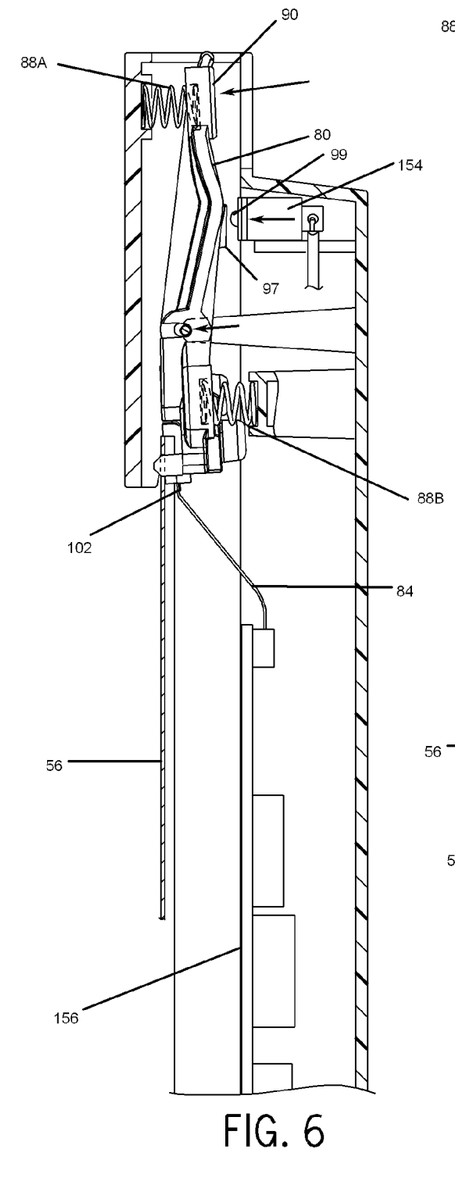
FIG. 6 is a partial side view of the display system and power clamp illustrated in FIGS. 1 through 5, illustrating the power clamp in a second position, wherein pivoting of the clamp handle towards the front of the display unit causes disengagement of the clamp with the actuator of the microswitch.

Turning next to FIG. 6, the power clamp 52 is illustrated in a second, unenergized position. In particular, upon depression of the button 90 of the actuating member 80, the springs 88A are compressed. The springs 88B urge the actuating member 80 towards the front of the display system, sliding the actuating member 80 to a position with the pin 94 at the rearmost portion 182 of the oval channel 92, as illustrated in FIG. 6. In this second, unenergized position, it can be seen that the ramp 97 is moved away from (spaced apart from) the actuator 99 of the microswitch 154, depowering the display system 50. It will be readily appreciated that movement of the actuating member 80 from a location in which the pin 94 is located at the frontmost portion 180 of the actuating member 80 to a position in which the pin 94 is located at the rearmost portion 182 of the oval channel 92 permits deactivation of the microswitch 154, but does disengage the mounting pegs 96 from the graphics panel 56. As such, the graphics panel 56 is still secured to the power clamp 52 of the display system 50.

Figure 7:
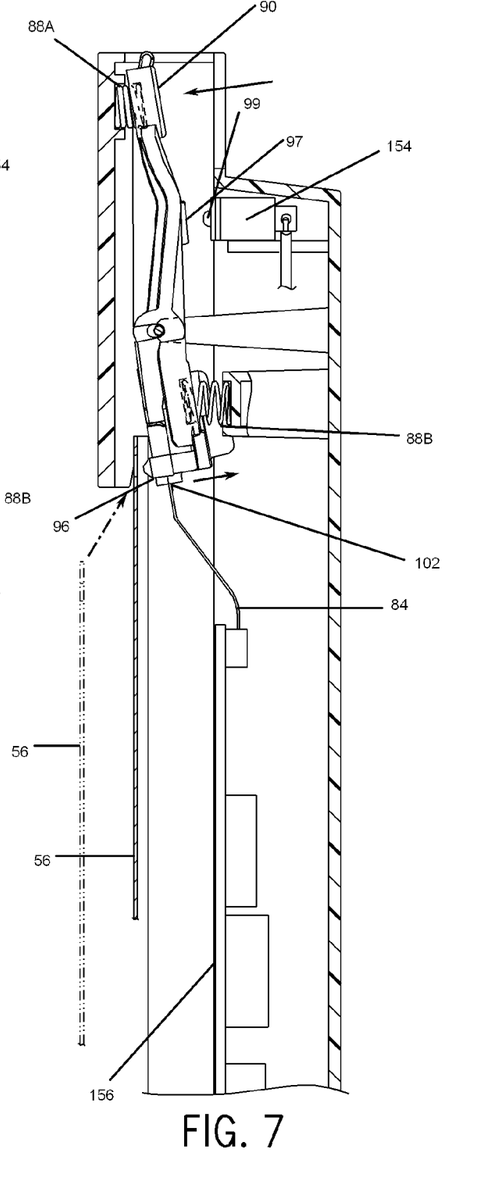
FIG. 7 is a partial side view of the display system and power clamp illustrated in FIGS. 1 through 6, illustrating the power clamp in a third position, wherein complete depression of the clamp handle towards the front of the display unit causes disengagement of the clamp with the illuminated graphics panel.
Figure 8:
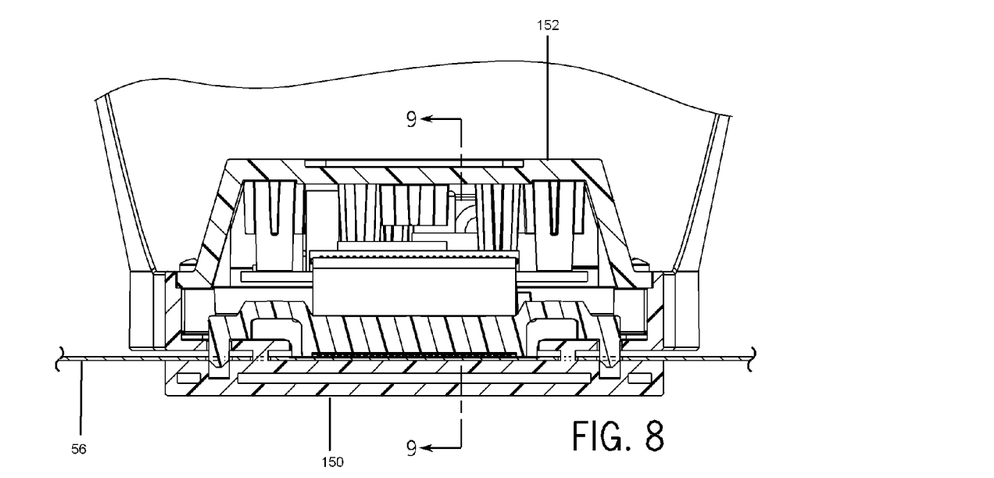
FIG. 8 is a partial top view of the display system and power clamp illustrated in FIGS. 1 through 7, taken along line 8-8 in FIG. 5.

Turning next to FIGS. 7 and 10, the power clamp 52 is illustrated in a third, release position. When the button 90 is completely depressed towards the front of the display (and the springs 88A are correspondingly further compressed), the pin 94 is positioned against the rearmost portion 182 of the oval channel 92, which permits the actuating member 80 to pivot, moving the front conductive interface 190 of the elastomeric connector 114 out of electrical communication and spaced apart from the contacts 74 on the flexible printed circuit 75 and moving the mounting pegs 96 out of functional engagement with the graphics panel 56. Accordingly, in this third position, the illuminated graphics panel 56 can be safely and easily removed from the display system.

When a different illuminated graphics panel 56 is to be installed on to the display system 50, the illuminated graphics panel 56 is properly positioned within the power clamp 50 using alignment slots 71 on the illuminated graphics panel 56. The slots 71 functionally engage guides (not shown) disposed on the front housing component 150 so that the contacts 74 of the flexible printed circuit 75 are properly aligned with the elastomeric connector 114 when the illuminated graphics panel 56 is secured within the display system 50. To activate the display system 50 and energize the power clamp 52, the button 90 of the clamp 52 is released, and the springs 88A and 88B once again bias the actuating member 80 into the first, energized position.

In this way, it can be seen that the present invention provides a power clamp 52 and display system 50 that permits easy installation and removal of an illuminated graphics panel 56 to a display system, without requiring hard wiring or soldering of the contacts of the flexible circuit panel to the connector or power source. The power clamp permits multiple open/close cycles without damaging the graphics panel 56/flexible printed circuit 75 and/or the contacts on the connector 114 or power source. Moreover, release of the illuminated graphics panel 56 from the display system 50 requires positive action, depression of the clamp button/lever 90, ensuring the system is unenergized prior to releasing the panel from the system.

Figure 14:
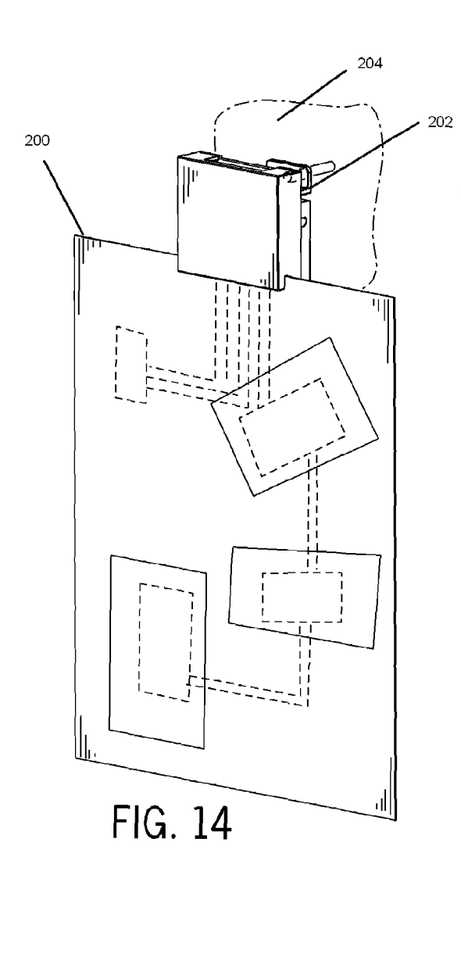
FIG. 14 is a display system incorporating the power clamp illustrated in FIGS. 4A, 4B and 11-13, according to an alternate embodiment of the present invention, wherein the display system is secured to a wall.
Figure 15:
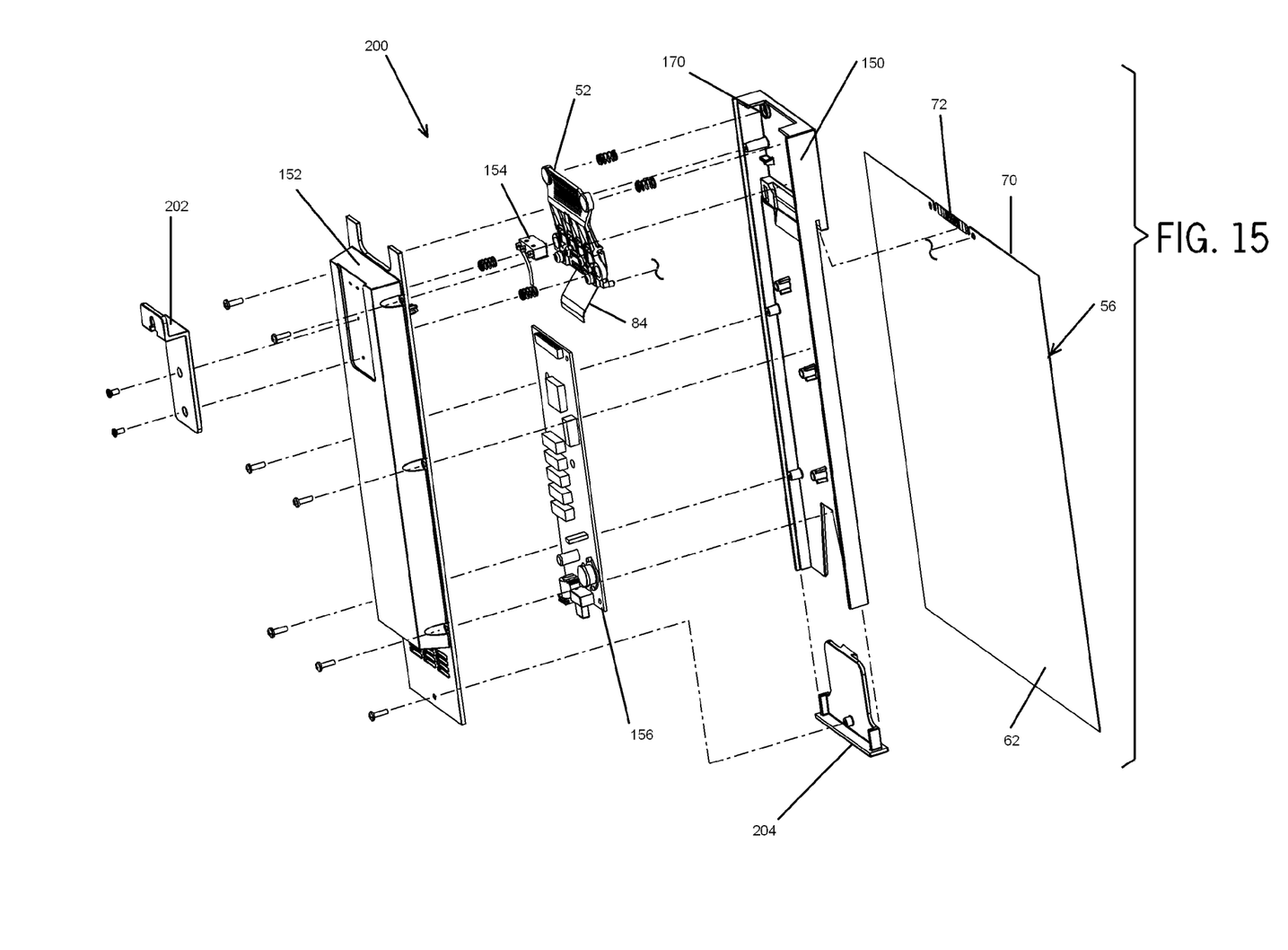
FIG. 15 is an exploded perspective view of the display system illustrated in FIG. 14.
Figure 16:
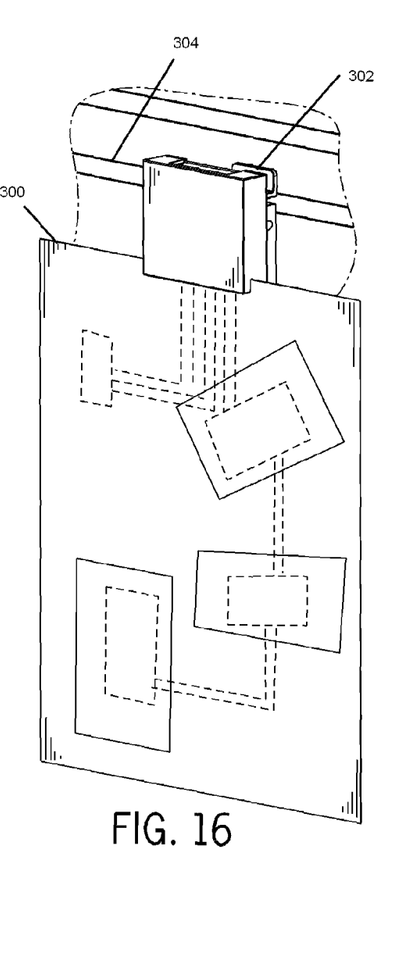
FIG. 16 is a display system incorporating the power clamp illustrated in FIGS. 4A, 4B and 11-13, according to an alternate embodiment of the present invention, wherein the display system is removably secured to a slat wall.
Figure 17:
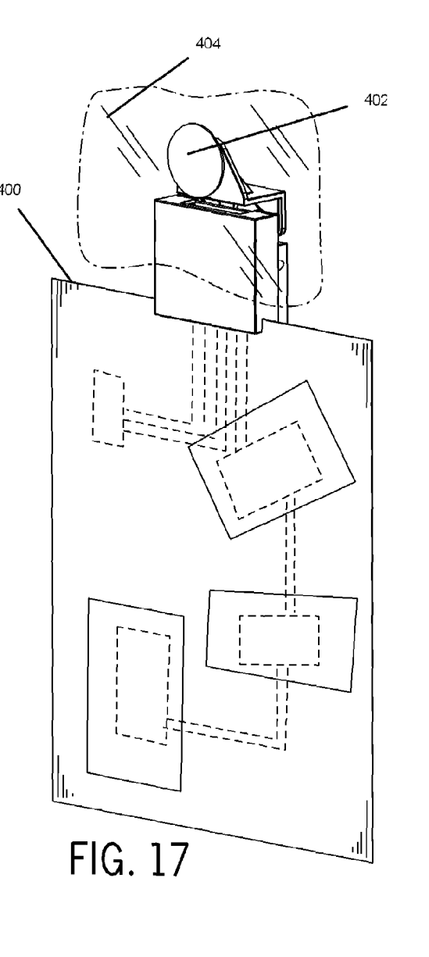
FIG. 17 is a display system incorporating the power clamp illustrated in FIGS. 4A, 4B and 11-13, according to an alternate embodiment of the present invention, wherein the display system is secured to a surface using suction.

Turning for the moment to FIGS. 14 through 17, alternate embodiments of the display systems of the present invention are shown. Each of the embodiments 200, 300 and 400 comprise the power clamp 52 as recited above. As illustrated in FIGS. 14 and 15, a display system 200 for securing the illuminated graphics panel 56 to a wall 204 is provided. A wall clip 202 is provided on the rear housing component 152 so that the system 200 may be hung from a wall. Likewise, a display system 300 is provided with a clip 302 for hanging the system 300 from a slat wall 304, as will be well known to those skilled in the art. Display system 400 includes a suction cup 402 to secure the system 400 to a window 404. It will be appreciated that the display systems of the present invention can include any clip, clamp, bracket or mounting mechanism required to secure the system to a wall, mirror, window, display cabinet or other surface.

It will be appreciated that the power clamp of the present invention can be used to removably secure a flexible printed circuit to a circuit board or other power source, and is not limited to display system applications. Further, the power clamp and display systems of the present invention can be of any size required by the given application, and are not limited in dimension, as will be well known to those skilled in the art. For example, the power clamp of the present invention can be used to removably supply power to any size illuminated panel/flexible printed circuit, such as a wall-sized or billboard sized panel, with hard wiring the power source to the panel.

What is claimed is:

1. A clamp for removably securing a display panel having electrically conductive terminals to a power source, the clamp comprising:
   a clamp housing;
   a connector disposed within the clamp housing;
   a power cable selectively electrically connectable to the connector within the clamp housing and electrically connected to the power source; and
   a biasing mechanism configured to bias the clamp housing in a first position wherein the connector is in electrical communication with both the electrically conductive terminals of the display panel and the power cable, wherein the clamp housing is movable to a second position wherein the connector is not in electrical communication with the electrically conductive terminals of the display panel.

2. The clamp of claim 1, wherein the clamp housing is movable to an intermediary position between the first and second positions such that the connector is in electrical communication with the electrically conductive terminals of the display panel but not in electrical communication with the power cable.

3. A display system comprising a stand and the clamp of claim 1.

4. A display system comprising a stand and the clamp of claim 2.

5. A clamp system for releasably connecting a display panel having a plurality of electrical contacts to a power source, the clamp system comprising:
   an insulating housing;
   a connector disposed within the insulating housing and having a conductive surface;
   a cable having a first connecting end selectively electrically connectable to the conductive surface of the connector and a second connecting end electrically connected to the power source; and
   a biasing mechanism in functional engagement with the insulating housing, the biasing mechanism biasing the housing in a first position wherein the connector is in electrical communication with both the electrical contacts of the display panel and the cable; wherein the insulating housing is movable to a second position wherein the connector is in electrical communication with the electrical contacts of the display panel but not in electrical communication with the cable; and wherein the insulating housing is movable to a third position wherein the connector is not in electrical communication with the electrical contacts of the display panel or the cable.

6. A graphical display system including a power source, the display system comprising:
   a support housing;
   an actuatable power clamp secured to the support housing, the actuatable power clamp including an electrical connector disposed at least partially therein, a power cable electrically connectable to the connector and electrically connected to the power source;
   a biasing mechanism functionally engaged to the actuatable clamp; and
   a display panel housing a plurality of electrical contacts, wherein the biasing mechanism biases the actuatable power clamp to a position wherein the connector is in releasable electrical communication with the electrical contacts of the display panel.

* * * * *

UNITED STATES PATENT AND TRADEMARK OFFICE
CERTIFICATE OF CORRECTION

PATENT NO. : 7,481,663 B2  Page 1 of 1
APPLICATION NO. : 11/952845
DATED : January 27, 2009
INVENTOR(S) : Frederick L. Kottke and Richard P. Hornblad It is certified that error appears in the above-identified patent and that said Letters Patent is hereby corrected as shown below:

Title page Inventor [75]
In the specification
The inventor name "Homblad" should be deleted and replaced with the name "Hornblad"

Signed and Sealed this

Thirty-first Day of March, 2009

JOHN DOLL
*Acting Director of the United States Patent and Trademark Office*